US008185637B2

(12) United States Patent
Belling (10) Patent No.: US 8,185,637 B2
(45) Date of Patent: May 22, 2012

(54) CONTROL OF SESSION PARAMETER NEGOTIATION FOR COMMUNICATION CONNECTION

(75) Inventor: Thomas Belling, Erding (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/843,986

(22) Filed: Jul. 27, 2010

(65) Prior Publication Data
US 2011/0040883 A1    Feb. 17, 2011

(30) Foreign Application Priority Data

Aug. 17, 2009  (WO) ................. PCT/EP2009/060637

(51) Int. Cl.
*G06F 15/16* (2006.01)
(52) U.S. Cl. ......... 709/227; 709/228; 709/229; 709/230
(58) Field of Classification Search .................. 709/227, 709/228, 229, 230
See application file for complete search history.

(56) References Cited

U.S. PATENT DOCUMENTS

| 2006/0046757 | A1* | 3/2006 | Hoover et al. ............... 455/518 |
| 2006/0253593 | A1* | 11/2006 | Jachner ..................... 709/227 |
| 2007/0294411 | A1 | 12/2007 | Hakkarainen ............... 709/227 |
| 2008/0081604 | A1* | 4/2008 | Sung et al. ................ 455/422.1 |
| 2008/0212523 | A1* | 9/2008 | Kuure et al. ................ 370/328 |
| 2009/0013078 | A1* | 1/2009 | Bencheikh .................. 709/227 |
| 2009/0262908 | A1* | 10/2009 | Choi et al. .................. 379/87 |
| 2010/0054257 | A1* | 3/2010 | Dolganow et al. ........ 370/395.21 |

OTHER PUBLICATIONS

Rosenberg, J., "Unifying Early Media, Manyfolks, and HERFP", Jan. 17, 2002, 36 pgs.
Camarillo, G., "The Early Session Disposition Type for the Session Initiation Protocol (SIP)", Dec. 2004, 11 pgs.

* cited by examiner

*Primary Examiner* — Liangche A Wang
(74) *Attorney, Agent, or Firm* — Harrington & Smith (57) ABSTRACT

The invention relates to a session control entity, method and a computer program product for determining a first media type indicated for a session associated with a dialogue and determining a second media type indicated for an early media associated with the dialogue, comparing if the first media type and the second media type are the same, and transmitting to a policy control entity, parameters relating to the early media in the same session information media component than parameters relating to the session, if the first media type and the second media type are the same.

9 Claims, 4 Drawing Sheets

CONTROL OF SESSION PARAMETER NEGOTIATION FOR COMMUNICATION CONNECTION

CROSS REFERENCE TO RELATED APPLICATION

This patent application claims priority from International Patent Application No. PCT/EP2009/060637, filed Aug. 17, 2009, the disclosure of which is incorporated by reference herein in its entirety.

TECHNICAL FIELD OF THE INVENTION

The present invention relates to a mechanism for controlling a session parameter negotiation in a communication connection. In particular, the present invention is related to a method and apparatus for controlling a session parameter negotiation in a communication connection when an early session or early media are to be established.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

New services are regularly developed and implemented in communication networks for improving quality or user experience. One example for such a new service is the so-called customized alerting tones (CAT) which will be supported, for example, by IP Multimedia Subsystem (IMS). The CAT service is an operator specific service by which an operator enables a subscriber to customize, for example, the media which is played to the calling party during alerting of the called party.

For the implementation of such new services like CAT, there are several mechanisms available. One of these mechanisms is the "early session model". In the early session (or early media) model, mechanisms for exchanging media (e.g., audio and video) before a particular (final) session is accepted by the called user are discussed. Within a dialog, early media occurs from the moment the initial INVITE is sent until a final response is generated. Examples of early media generated by the callee are ringing tone and announcements (e.g., queuing status). An offer/answer exchange is used where a so-called disposition type of the session descriptions is indicated as "session" (for final session setting) or "early session" (for early session setting), depending on which session type the respective offer/answer is related to.

Conventionally, early media are established in the same way as regular media. That is, an offer/answer exchange is used where a so-called disposition type of the session descriptions is indicated as "session" (for final session setting). This way of establishing early media sessions is also known as gateway model.

Towards the access network, Policy and Charging control (PCC) is used to authorize or reserve transmission resources, e.g. in general packet radio service (GPRS) or long term evolution (LTE) packet networks and the attached radio networks, and configure service specific charging for the services negotiated via the IMS. The IMS Proxy Call Session Control Function (P-CSCF) conveys service information derived from the session description information (SDP) within the IMS signalling via so-called Rx interface towards the Policy and Charging Rules Function (PCRF), that in turn can derive PCC rules and possibly QoS Rules from this information and policy configured by the operator, and can convey these PCC rules towards the Policy and Charging Enforcement Function (PCEF), such as gateway GPRS support node (GGSN), over so-called Gx interface and the QoS rules towards the Bearer Binding and Event Reporting Function (BBERF). The PCEF and/or BBERF can interact with other packet network nodes to authorize resource requests from the User Equipment (UE) or to set up or configure transmission resources towards the LIE. The PCEF can also control the IP flows of user plane data passed through it, only passing flows that are authorized by PCC rules and collecting charging related data related to those PCC rules.

However, reactions of a P-CSCF not supporting the early-session disposition type and receiving such SDP are undefined in standards, but behaviour leading to blocking of media or call failure may happen, such as:

The P-CSCF could reject such call setups.
The P-CSCF could also intermingle the SDP for early session and final session, possible resulting in wrong filters to be installed and wrong QoS to be provisioned in the PCEF for the early or final session, and thus in the blocking of early and/or final media flow.
The P-CSCF could also ignore the early-session disposition SDP, thus preventing a configuration of the PCEF to support them, resulting in a blocking of the early media streams.

SUMMARY OF THE INVENTION

The present invention overcomes the above problem by providing a session control function in a communication system, comprising
means for determining a first media type indicated for a session associated with a dialogue;
means for determining a second media type indicated for an early media associated with the dialogue;
means for comparing if the first media type and the second media type are the same; and
means for transmitting to a policy control entity, parameters relating to the early media in the same session information media component than parameters relating to the session, if the first media type and the second media type are the same.

Further, a method of controlling an establishment of a communication connection is provided, comprising:
determining that the same media type is indicated for early media associated with a dialogue and for a session associated with the dialogue;
transmitting to a policy control entity, parameters relating to the early media in the same session information media component as parameters relating to the session.

The transmitting in the same session information media component can comprise assigning the same media component number to the parameters relating to the early media and to the parameters relating to the session. further, determining if the parameters for the session and the parameters for the early media, when being the same media type, are defining flows for the same direction, or being both bidirectional can be performed, and only if the directions match, the same session information media component is used.

Further, an apparatus is provided, comprising,
a session unit configured to receive session control signaling according to session initiation protocol (SIP) associated with a session and to extract session description protocol (SDP) information encapsulated in the received SIP signaling;
a detecting unit configured to detect an early session disposition and a session disposition in the SDP of the SIP signaling associated with the session;
a comparing unit configured to compare the early session disposition and the session disposition and to determine if a single media line with one media type is contained in the early session disposition and if a single media line with the same media type is contained in the session disposition.
a describing unit configured to describe both media lines in a single session information media component towards a policy control entity by using the same media component number if the both media lines are of the same type.

Embodiment of the present invention may have one or more of following advantages:
impacts are limited to the P-CSCF.
Avoid mistakes in Qos provisioning and filter installation, and blocking early media streams.

DETAILED DESCRIPTION OF THE INVENTION

Different types of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

A policy and charging rules function (PCRF) is a function that defines and provides the policy and charging rules that are used in the policy enforcement points for policy control and flow-based charging control.

Attribute-value pair (AVP) is a generic pair of values that consists of an attribute header and the corresponding value. The AVP can be used to encapsulate protocol-specific data such as routing information, as well as authentication, authorisation, or accounting information.

Figure 1:
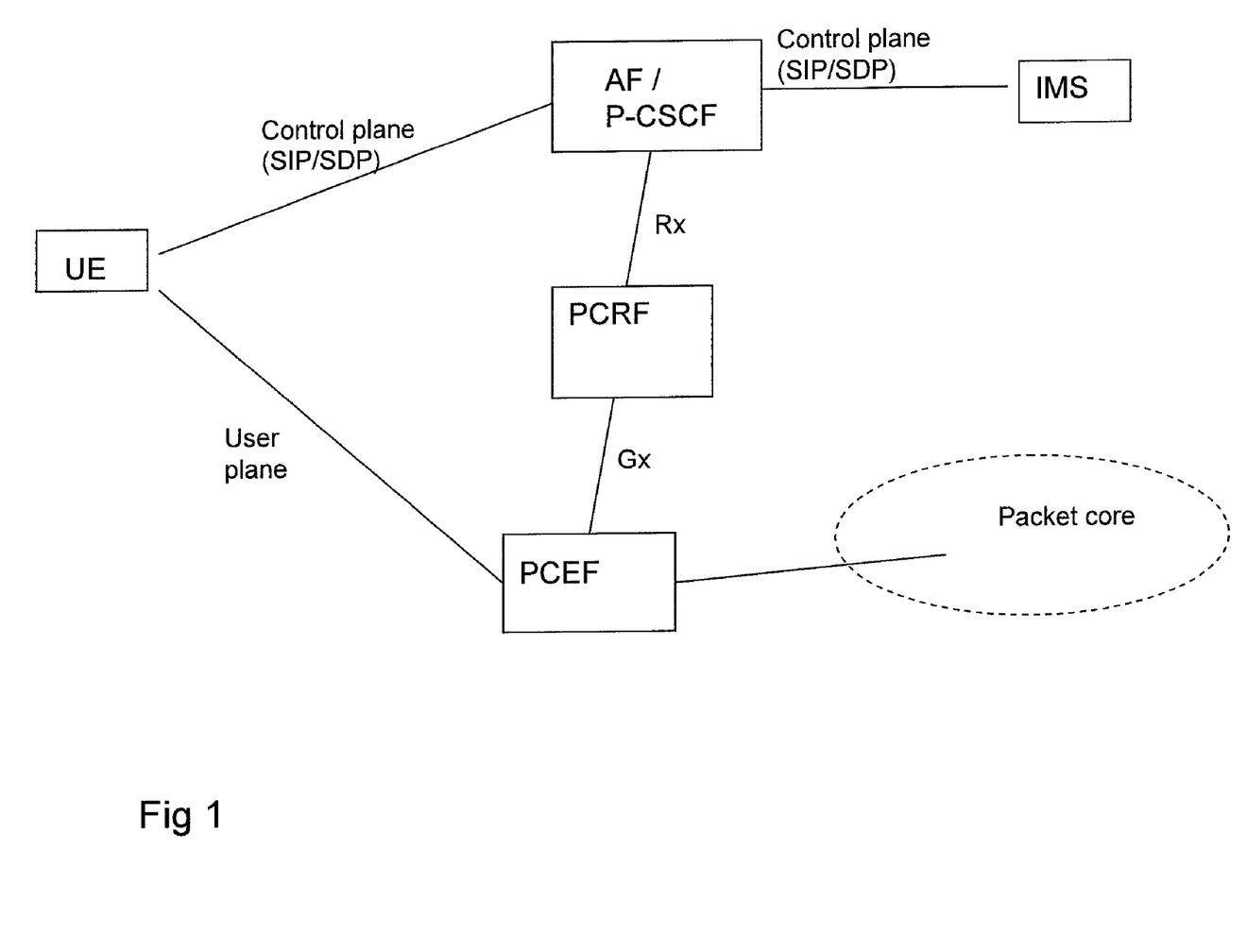
FIG. 1 illustrates network architecture relevant for aspects of the invention.

As shown in FIG. 1, Rx reference point resides between an application function (AF), such as P-CSCF, and the PCRF. The AF may be a third party application server.

The Rx reference point enables transport of application level session information from AF to PCRF. Such information can include, but is not limited to:
IP filter information to identify the service data flow for policy control and/or differentiated charging;
Media/application bandwidth requirements for QoS control.

The Rx reference point enables the AF subscription to notifications on signalling path status of AF session in an IP connectivity access network (IP CAN).

So-called Gx reference point resides between the PCEF and the PCRF. The Gx reference point enables a PCRF to have dynamic control over the PCC behaviour at a PCEF.

The Gx reference point enables the signalling of PCC decision, which governs the PCC behaviour, and it supports for example following functions:
Request for PCC decision from PCEF to PCRF;
Provision of PCC decision from PCRF to PCEF;

The Early Session Disposition Type for the Session Initiation Protocol (SIP) has been described in Request for Comments (RFC) 3959 specification of the IETF. The treatment of "early-session" bodies is similar to the treatment of "session" bodies. That is, they follow the offer/answer model. Their only difference is that session descriptions whose disposition type is "early-session" are used to establish early media sessions within early dialogs, as opposed to regular sessions within regular dialogs. With early session disposition type a separate SDP offer-answer exchange takes place for early media. This may result in different codecs with different QoS requirements being negotiated for early and final media, and for different IP addresses and ports to be used for early and final media.

It is desirable to avoid a temporal need for over provisioning of bandwidth at the air interface and to avoid reconfigurations of the radio bearer after the call establishment is completed. Thus, it appears desirable that the maximum of bandwidth and QoS between early and final media is provisioned or authorized during the call establishment.

It is desirable to limit the impacts of the Early Session disposition type handling on as few network elements as possible, ideally to the P-CSCF only.

In the following, some optional features and requirements are listed to improve early media handling:
1. During the session establishment, resources for the early media described with the early session disposition type can be authorised or provisioned.
2. After the completion of the session establishment, resources for the final media described with the session disposition type can be authorised or provisioned.
3. UE-initiated bearer request for final media can be authorized already during the call establishment phase in the same manner as if no early session were in use.
4. Network initiated resource requests for final media can also occur once the first offer-answer with "session" disposition is completed to avoid clipping.

5. It would be desirable to avoid a reconfiguration of the radio bearer after the call establishment phase.
6. After the completion of the session establishment, resources for the early media can be released or reused for final media.
7. A reservation of radio resources for a temporal parallel transmission of early and final media during the call establishment phase can be prevented; it is preferable that maximum bandwidth and QoS required either for early or final media can be provisioned or authorized during the call establishment
8. PCC support of the early session disposition type can be required at the originating side.

Requirements 5, 6 and 7 could be best addressed by placing early media and corresponding final media in the same PCC rules.

According to aspects of the invention, the P-CSCF procedures are updated to support the Early Session disposition type so that early media flows and corresponding established media flows are placed into the same PCC, and reusing Rx functionality to support forking. Particular rules to derive Flow Identifiers from "early session" disposition SDP can be defined to allow identifying "early session" related media components in a unique manner that avoids conflicts with "session" disposition SDP related media components.

According to aspects of the invention, a P-CSCF can receive "early session" disposition SDP in addition to "session" disposition SDP in SIP early dialogues.

The P-CSCF can then provision service information derived both from the "early session" disposition SDP and "session" disposition SDP. The P-CSCF can apply following mapping rules to derive the flow identifiers from "early session" disposition SDP:

If a single media component with one media type (e.g. "audio" or "video") is contained in "early session" disposition SDP and a single media component with the same media type is contained in the "session" disposition SDP of the same SIP dialogue, and if both SDP media components are described in a single Rx service information media component, that Rx service information media component shall obtain the media component number derived from "session" disposition SDP following the rules according to normal procedure, that can be the ordinal number of the position of the "m=" line in the SDP.

Additionally, otherwise each media component shall obtain the ordinal number of the position of the "m=" line in the "early session" disposition SDP plus 1000 as media component ordinal number.

For example, if a single media line with one media type (e.g. "audio" or "video") is contained in "early session" disposition SDP and a single media line with the same media type is contained in the "session" disposition SDP of the same SIP dialogue, and both media lines describe service flows of the same directionality (uplink, downlink, or bidirectional), the P-CSCF can describe those SDP media lines in the same session information media component (with the same flow ID/media component number). The "early session" disposition SDP may also contain media lines of a type not included in the "session" disposition SDP, or several media lines of the same type. Such media components can be described in own media components in the service information.

If the P-CSCF desires to invoke special policies or separate event notifications for an "early session" disposition media line, it may choose to provision a separate session information media component even if a media line with the same media type and directionality is contained in "session" disposition SDP.

If a PCRF could supply separate PCC rules for early media and the corresponding final media, this may lead to an over provisioning of resources during call establishment and a subsequent reconfiguration of the radio bearer, or even to a call failure if the extra resources are not authorized or available.

According to aspects of the invention, if the P-CSCF receives "early session" disposition SDP before "session" disposition SDP, it can wait to receive the first "session" disposition SDP before supplying service information derived from the "early session" disposition SDP. The "session" disposition SDP offer can occur before the "early session" disposition SDP offer, but can also occur in parallel or in exceptional cases afterwards. The "session" disposition SDP answer can be contained in the same SIP message as the "early session" disposition SDP offer, or can be sent in a 200 OK response to an INVITE, i.e. after the "early session" disposition SDP answer.

According to aspects of the invention, if the P-CSCF includes any media component relating both to "early session" disposition SDP and "session" disposition SDP in the service information, the P-CSCF can:
  provision the service information derived from "early session" disposition SDP and the service information derived from "session" disposition SDP in separate Rx AA-Requests; and/or
  provision the first service information (either derived from "early session" disposition SDP or "session" disposition SDP) without the SIP-Forking-Indication AVP, or with the SIP-Forking-Indication AVP with value SINGLE DIALOGUE; and/or
  provision all subsequent service information during ongoing call establishment with the SIP-Forking-Indication AVP with value SEVERAL_DIALOGUES.

The P-CSCF may need to provision the service information derived from "early session" disposition SDP and the service information derived from "session" disposition SDP in separate Rx AA-Requests because the encoding of the media-component does not allow for the simultaneous provisioning of two corresponding filters.

According to aspects of the invention, updating the Provisioned Service Information when Dialogue is established can take place. The P-CSCF can store the SDP information for the "session" disposition type until the first final SIP answer is received. Then the early media described in the "early session" disposition type SDP can be terminated. The P-CSCF can then update the service information to match the requirements of the media described in the "session" disposition type SDP only:
  If the P-CSCF included any media component relating both to "early session" disposition SDP and "session" disposition SDP in the service information, the P-CSCF can send an AA request without the SIP-Forking-Indication AVP or with a SIP-Forking-Indication AVP with value SINGLE_ DIALOGUE and can include the service information derived from the "session" disposition SDP. The P-CSCF shall provision the full service information including the applicable Flow-Description AVP(s) and Flow-Status AVP(s).
  The P-CSCF can disable any media component(s) in the service information that relate to early media only by setting their flow status to "removed".

According to aspects of the invention, SIP-Forking-Indication AVP can be reused. A motivation for reusing functionality designed for forking comes from requirements 5, 6 and 7 above which are quite similar to forking. For a policy to place early media flows and established media flows into the same PCC rules, as recommended above for the Gx interface, PCRF functionality can be simplified and existing functionality can be reused.

However, reusing the Rx functionality to support SIP forking is complicated by some noteworthy differences between call flows with forking and with "early session" disposition SDP:

a. With forking, only one SDP offer is available but multiple answers. However, the "early session" disposition SDP and the "session" disposition SDP are not interrelated in any manner. Consequences are detailed below.
b. There may be early media flows with no corresponding final media flows of same type (for instance, only early media may have a video component)
c. The order of sequence of m-lines in "early session" disposition SDP or "session" disposition SDP may be different (for instance video and audio m-line may be interchanged)
d. Corresponding media components (e.g. the only media component of audio media type in "early session" disposition SDP or "session" disposition SDP) may have different ports and IP addresses also at the caller's side, not only at the callee's side
e. The "early session" disposition SDP type may also be encountered at the terminating side
f. The "early session" disposition SDP and the "session" disposition SDP may both be contained together in a single SIP message.

Forking is ability of a SIP proxy to send SIP requests to multiple destinations at the same time. The forking related functionality in the Rx protocol does not contain explicit restrictions related to points d. and e. above, and it is therefore expected that existing PCRF implementations may already be able to handle a SIP-Forking-Indication AVP at the terminating side and media components where filter information related to the caller differs while the forking indication is set (although a PCRF might have policies to check these points). The other outlined issues will need to be considered in the protocol design.

According to aspects of the invention, for the first provisioning of session information (either derived from "early session" disposition SDP or "session" disposition SDP) the P-CSCF does not supply the SIP-Forking-Indication AVP. When the P-CSCF then provisions service information derived from the other type of SDP, and for any subsequent provisioning until the call establishment is completed, the SIP-Forking-Indication AVP can be supplied with value SEVERAL_DIALOGUES. Early and corresponding final media can be described in the same Media-Component-Description AVP; it is discussed further down what "corresponding" media means and how flow identifiers are selected for them. Early and final media that do not have corresponding final or early media, respectively, can be described in separate media components and obtain distinct flow identifiers. If a special policy for early media is desired, early media with corresponding final media can also be described in separate Media-Component-Description AVPs. Session information containing any media components describing a "corresponding" early and final media flow shall be provisioned in separate Rx messages for early media and final media, as the encoding of the media-component does not allow for the simultaneous provisioning of two corresponding filters. When the session establishment is completed, the complete session information derived from the "session" disposition SDP can be provisioned without the SIP-Forking-Indication AVP and any media components that relate to early media only obtain flow status "removed".

Figure 2:
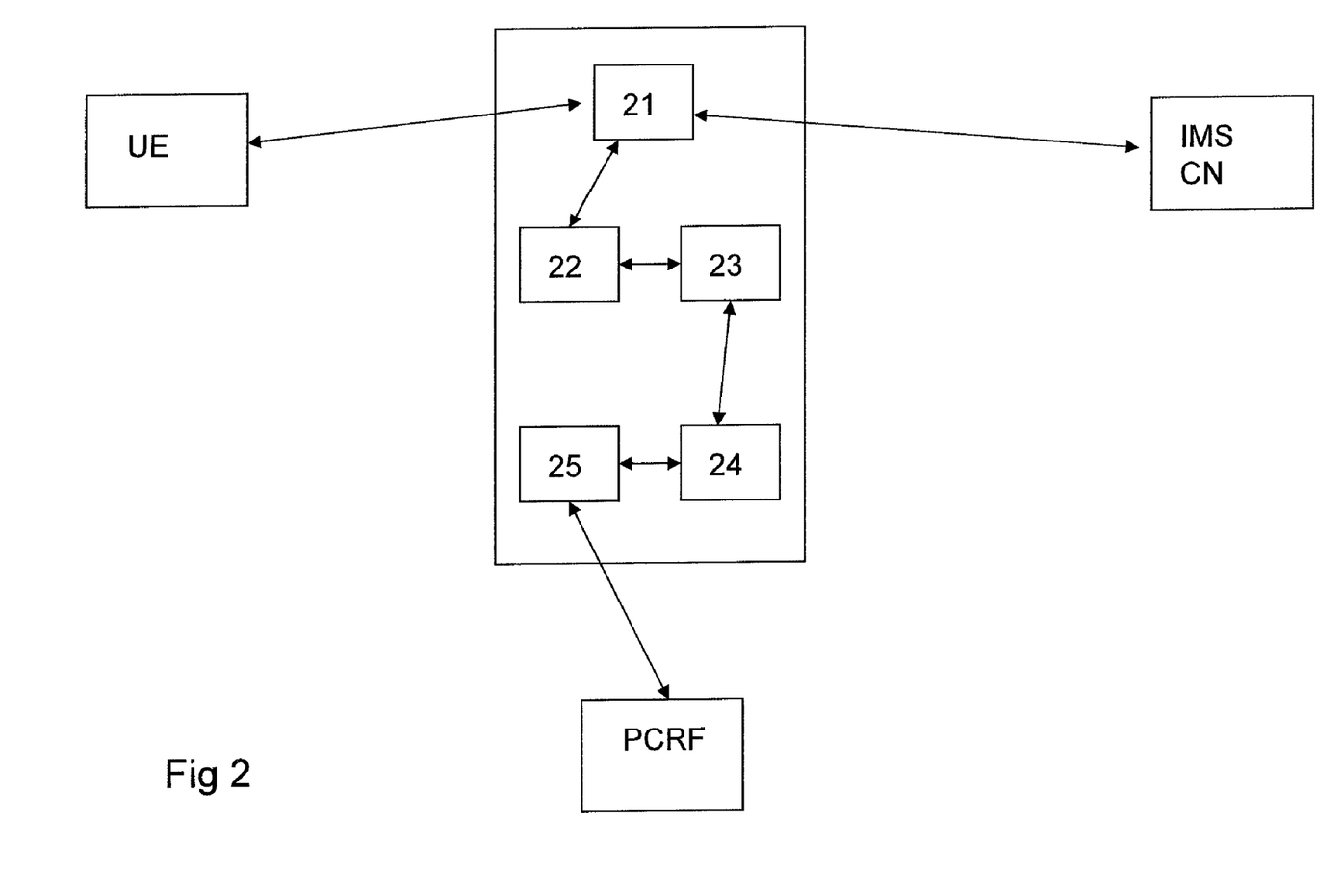
FIG. 2 illustrate internal structure and functions of an apparatus implementing aspects of the invention.

FIG. 2 shows example internal structure and functions of an apparatus, such as a session control device, implementing functions according to aspects of the invention. The apparatus comprise a session unit 21 configured to receive session control signalling associated with a session, for example, according to SIP. The session unit 21 can be configured to extract SDP information encapsulated in received SIP messages associated with the session. A detecting unit 22 can be configured to detect an early session disposition and a session disposition of the SDP, for example, during establishment of an early dialogue associated with the session. A comparing unit 23 can be configured to compare the early session disposition and the session disposition, and can be configured to determine if a single media line with one media type (e.g. audio or video) is contained in the early session disposition and if a single media line with the same media type is in contained in the session disposition. The comparing unit 23 can be configured to determine if the both media lines with same media type describe service flows of the same directionality (uplink, downlink, or bidirectional). A describing unit 24 can be configured to describe both media lines in a single session information media component if the both media lines are of the same type, or alternatively, only if the media lines additionally have the same directionality. The describing unit 24 can be configured to include the session information media component in a Diameter request, such as Diameter authentication request, for example in a AA-Request. The describing unit 24 can be configured to add an indication indicating several dialogues in the request. A transmitting unit 25 can be configured to transmit the session information media component to a policy control function, for example as part of Rx signalling.

The session unit 21 can be configured to receive one of an early session disposition and a session disposition in a SIP INVITE request and the other one in a response to the SIP INVITE request. The session unit 21 can be configured to wait to receive the first session disposition SDP before supplying service information derived from the early session disposition SDP, if the session unit 21 receives early session disposition SDP without having received session disposition SDP.

All units described above may be implemented for example using microprocessors, chips and/or other electrical components and/or by software.

A policy control function and a session control device may be physically implemented in a switch, router, server or other hardware platform or electronic equipment which can support data transmission and processing tasks, or can be implemented as a component of other existing device.

Figure 3:
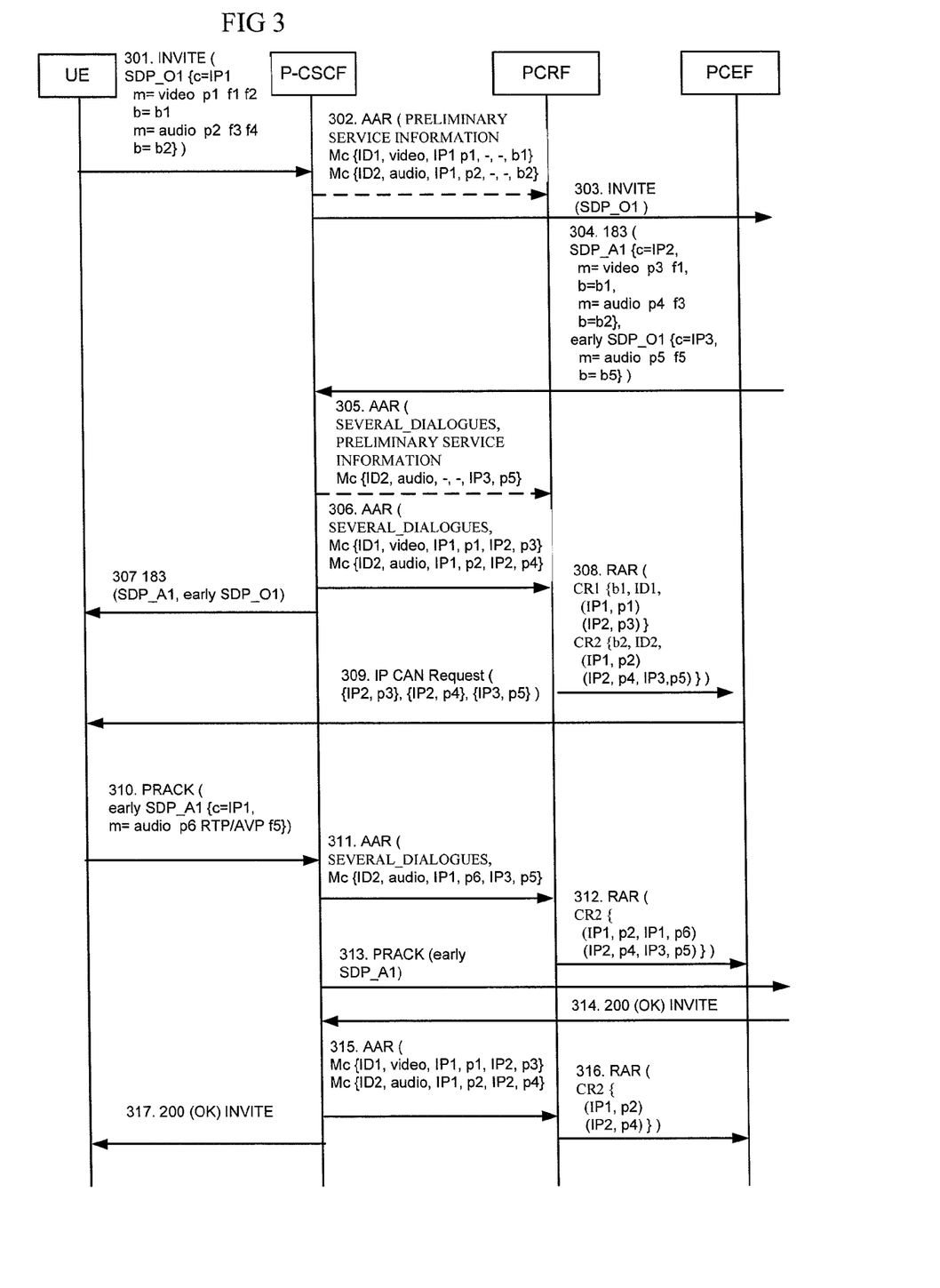
FIGS. 3 and 4 illustrate message flows according to aspects of the invention.

FIG. 3 illustrates a message flow relevant for aspects of the invention. In signal 301, an INVITE request is transmitted to a P-CSCF. The INVITE includes an SDP offer (SDP_O1) of "session" disposition type with a connection IP address IP1 and the description of two media parameters: The first media line (m=video) with parameters UDP or TCP port p1, and format descriptors designating codecs f1 and f2, and the second media line (m=audio) with parameters UDP or TCP port p2, and format descriptors designating codecs f3 and f4. Bandwidth descriptors assigning a bandwidth to the m-line can be included in addition; in this example bandwidth b1 is allocated to the first m-line and bandwidth b2 is assigned to the second m-line. In signal 302, the P-CSCF can transmit these parameters in a session information media component to a policy control entity, such as the PCRF, for example in a Rx AA-Request, and can set the type as PRELIMINARY SERVICE INFORMATION. In the signal 302, the different medias for authorization can be identified with media component (Mc) numbers, here with ID1 and ID2, following the description of the media (type, IP address, parameters). The media component numbers will be derived from the order of the corresponding m-lines in SDP, i.e. ID1=1 and ID2=2. In signal 303, the INVITE request is transmitted towards the called party. In signal 304, the P-CSCF receives a response to the INVITE request, such as SIP 183 response. The response includes an SDP answer (SDP_A1) of "session" disposition type which can accept original proposed media parameters from the SDP_O1 and also includes IP address IP1 and ports P3 and p4 applicable as destination for media streams towards the callee, and in addition can include an SDP offer (early SDP_O1) of "early session" disposition type for early media, including a connection IP address IP3 and the media line (m=audio, with parameters UDP or TCP port p5 and format descriptors designating codecs f5). The P-CSCF can detect that the early media includes one media line (m=audio) which is of the same type as one of the media lines in the initial SDP_O1 in the INVITE 301 and reported in the session information media component to the PCRF with certain media component number (here Mc with ID2 in signal 302). In signal 305, the P-CSCF can transmit a subsequent media authorization signal to the PCRF with a second session information media component, including information of the early media from early_SDP_O1 received in the SIP 183. According to aspects of the invention, the P-CSCF can describe the early media related information in the second session information media component with the same media component number (here ID2) as was used for the media with the same type in the first session information media component. The P-CSCF also applies the indication "Several Dialogues" to indicate that the PCRF shall reserve the maximum bandwidth as required either for the media component with the same ID in earlier messages (here signal 302) or in the present message. Further, the P-CSCF applies the indication "preliminary service information" to indicate that the service information is incomplete. It is advantageous if the P-CSCF supplies this message before signal 306 to enable the PCRF to take this information into account when starting the resource reservation in signal 307. In signal 306, the P-CSCF can complete original media parameters already transmitted in signal 302 to the PCRF, with additional parameters received from the called UE, as the parameters have been accepted by the called UE in the SDP_A1. In signal 307, the SIP 183 is transmitted towards the calling UE. In signal 308, the PCRF can implement the policy decision by enforcing the rules to a user plane element (PCEF), such as a GGSN. In signal 309 the PCEF establishes the IP-CAN bearer. In signal 311, after receiving signal 310 with SDP_A1 for the early media, P-CSCF can complete the early media related parameters to the PCRF, after which the PCRF can update the policy enforcement rules to the PCEF in signal 312.

With signals 313-317, the session setup and session parameter negotiation can be completed according to SIP and SDP procedures. In signal 315, the P-CSCF updates the session information with media component description only matching the final media to avoid that communication with the IP address and ports designated to early media is further passed. In signal 316, the PCRF updates the PCEF accordingly.

Figure 4:
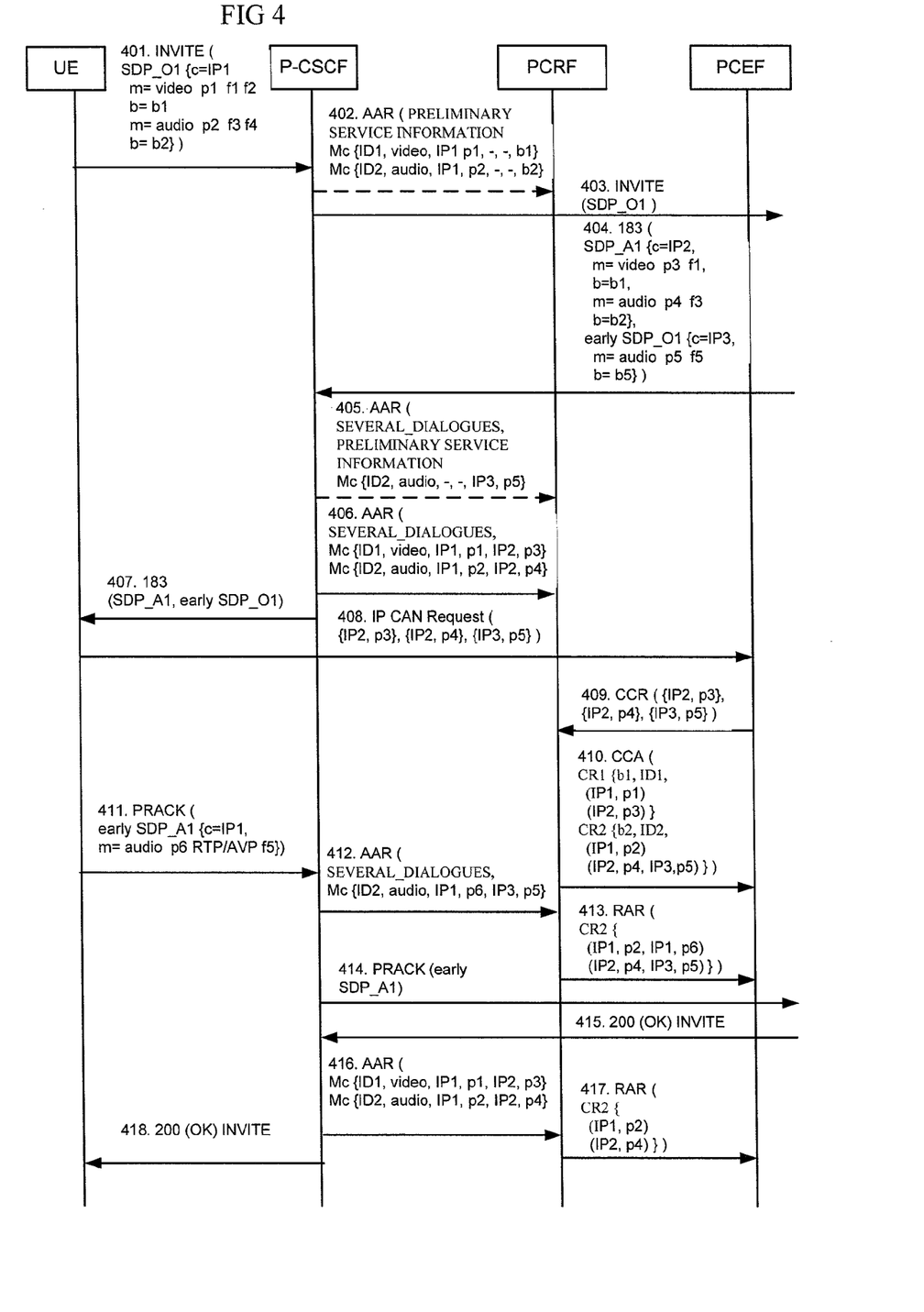

In FIG. 4, the difference to FIG. 3 is that the IP-CAN bearer is established by the calling UE with signal 408 instead of the network establishing the bearer.

The invention is not limited to policy control and session parameter negotiation in the IMS network(s), but may also be applied in other type of networks having similar kind of session parameter negotiation logic, possibility for early media and policy control element. Therefore, the P-CSCF, PCRF and PCEF are only used here as examples of a session control entity, and policy control entities. Functions of the session control device and the policy control function described above may be implemented by code means, as software, and loaded into memory of a computer.

The invention claimed is:

1. An apparatus, comprising:
   means for determining a first media type indicated for a session associated with a dialogue;
   means for determining a second media type indicated for an early media associated with the dialogue;
   means for comparing if the first media type and the second media type are a same media type; and
   means for transmitting to a policy control entity, parameters relating to the early media and parameters relating to the session in a same session information media component, if the first media type and the second media type are the same media type.

2. The apparatus of claim 1, wherein the means for transmitting comprises means for assigning a same media component number to the parameters relating to the early media and to the parameters relating to the session.

3. The apparatus of claim 1, further comprising means for determining if the parameters for the session and the parameters for the early media, when being the same media type, are defining flows for a same direction, or being both bidirectional, and wherein only if the directions match, the same session information media component is used.

4. The apparatus of claim 1, further comprising means for applying a session initiation protocol-forking indication attribute-value pair with a value SEVERAL_DIALOGUES when transmitting, to the policy control entity, the same session information media component.

5. The apparatus of claim 1, further comprising:
   means for receiving signaling indicating a completion of a call setup; and
   means for transmitting, to the policy control entity, the media component parameters relating to the session, in response to receiving the signaling indicating the completion of the call setup.

6. A method of controlling an establishment of a communication connection, comprising:
   determining that a same media type is indicated for an early media associated with a dialogue and indicated for a session associated with the dialogue;
   transmitting, to a policy control entity, parameters relating to the early media and parameters relating to the session in a same session information media component.

7. The method of claim 6, further comprising assigning a same media component number to the parameters relating to the early media and to the parameters relating to the session.

8. A computer program product comprising code means adapted to produce steps of claim 6 when loaded into the memory of a computer.

9. An apparatus, comprising,
   a session unit configured to receive session control signaling according to session initiation protocol (SIP) associated with a session and to extract session description protocol (SDP) information encapsulated in the received SIP signaling;
   a detecting unit configured to detect an early session disposition and a session disposition in the SDP of the SIP signaling associated with the session;
   a comparing unit configured to compare the early session disposition and the session disposition and to determine if a single media line with one media type is contained in the early session disposition and if a single media line with the same media type is contained in the session disposition; and a describing unit configured to describe both media lines in a single session information media component towards a policy control entity by using the same media component number if the both media lines are of the same type.

* * * * *